US009075296B2

(12) United States Patent
Watanabe et al.

(10) Patent No.: US 9,075,296 B2
(45) Date of Patent: Jul. 7, 2015

(54) PROJECTION DISPLAY DEVICE

(75) Inventors: Toshiyuki Watanabe, Osaka (JP); Hiroaki Yoshida, Osaka (JP); Hideki Yamamoto, Kyoto (JP); Katsumi Terada, Kyoto (JP); Toru Kirimura, Aichi (JP); Yoshiyuki Noda, Osaka (JP); Yasumasa Suita, Osaka (JP); Tsutomu Kashima, Osaka (JP); Masahiro Haraguchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 227 days.

(21) Appl. No.: 13/877,283

(22) PCT Filed: Sep. 22, 2011

(86) PCT No.: PCT/JP2011/071549
§ 371 (c)(1),
(2), (4) Date: Apr. 1, 2013

(87) PCT Pub. No.: WO2012/046575
PCT Pub. Date: Apr. 12, 2012

(65) Prior Publication Data
US 2013/0201457 A1    Aug. 8, 2013

(30) Foreign Application Priority Data
Oct. 4, 2010  (JP) ................. 2010-224999

(51) Int. Cl.
*G03B 21/14* (2006.01)
*G09G 3/00* (2006.01)
(Continued)

(52) U.S. Cl.
CPC .............. *G03B 21/147* (2013.01); *G09G 3/001* (2013.01); *G09G 2320/0693* (2013.01);
(Continued)

(58) Field of Classification Search
USPC .............. 353/69, 70, 101, 121, 122; 382/162, 382/167, 168, 274
See application file for complete search history.

(56) References Cited

U.S. PATENT DOCUMENTS 6,530,666 B1 *  3/2003  Smith et al. ................... 353/121
6,592,228 B1 *  7/2003  Kawashima et al. ......... 353/101
(Continued)

FOREIGN PATENT DOCUMENTS

JP    10-161243    6/1998
JP    2006-060447  3/2006
(Continued)

OTHER PUBLICATIONS

Sukthankar, et al., "Smarter Presentations: Exploiting Homography in Camera-Projector Systems" Proceedings of International Conference on Computer Vision, pp. 247-253, 2001.

*Primary Examiner* — William C Dowling
(74) *Attorney, Agent, or Firm* — Hamre, Schumann, Mueller & Larson, P.C.

(57) ABSTRACT

A projection display device includes an optical modulation element configured to modulate light outputting from a light source, and a projection unit configured to project light modulated by the optical modulation element on a projection screen. The projection display device includes an element control unit that controls the optical modulation element to display a test pattern image, an acquiring unit that acquires an image obtained by capturing the test pattern image from an image capture element that captures the test pattern image projected on the projection screen, and an adjusting unit that adjusts an image projected on the projection screen on the basis of the capture image acquired by the acquiring unit. The element control unit controls the optical modulation element such that a guidance image that guides focus adjustment of the image projected on the projection screen is displayed.

8 Claims, 17 Drawing Sheets

(51) Int. Cl.
  *H04N 9/31* (2006.01)
  *G03B 21/26* (2006.01)
  *G03B 21/53* (2006.01)

(52) U.S. Cl.
  CPC ........ *G09G 2360/145* (2013.01); *H04N 9/317* (2013.01); *H04N 9/3185* (2013.01); *H04N 9/3194* (2013.01); *G03B 21/142* (2013.01); *G03B 21/26* (2013.01); *G03B 21/53* (2013.01)

(56) References Cited

U.S. PATENT DOCUMENTS

| | | | |
|---|---|---|---|
| 8,523,366 | B2* | 9/2013 | Takahashi ........................ 353/69 |
| 2004/0061838 | A1* | 4/2004 | Mochizuki et al. ............. 353/69 |
| 2005/0024606 | A1* | 2/2005 | Li et al. ........................ 353/121 |
| 2005/0286026 | A1* | 12/2005 | Matsumoto et al. .......... 353/101 |
| 2006/0038962 | A1 | 2/2006 | Matsumoto et al. |
| 2006/0109426 | A1* | 5/2006 | Williams ........................ 353/69 |
| 2006/0209268 | A1 | 9/2006 | Raskar et al. |
| 2010/0026972 | A1* | 2/2010 | Kaneko ......................... 353/101 |
| 2010/0214540 | A1* | 8/2010 | Sajadi et al. ................... 353/101 |
| 2011/0025988 | A1* | 2/2011 | Haraguchi et al. ............... 353/70 |
| 2012/0206696 | A1* | 8/2012 | Haraguchi et al. ............... 353/69 |
| 2012/0218523 | A1* | 8/2012 | Mizuno et al. .................. 353/69 |

FOREIGN PATENT DOCUMENTS

| | | |
|---|---|---|
| JP | 2008-533501 | 8/2008 |
| JP | 2010-117514 | 5/2010 |

* cited by examiner

Direction of predetermined line

Direction of predetermined line

Direction of predetermined line →

Direction of predetermined line →

FIG. 27
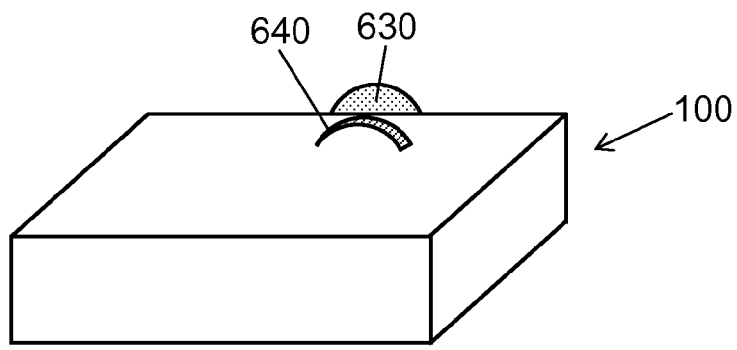
FIG. 28
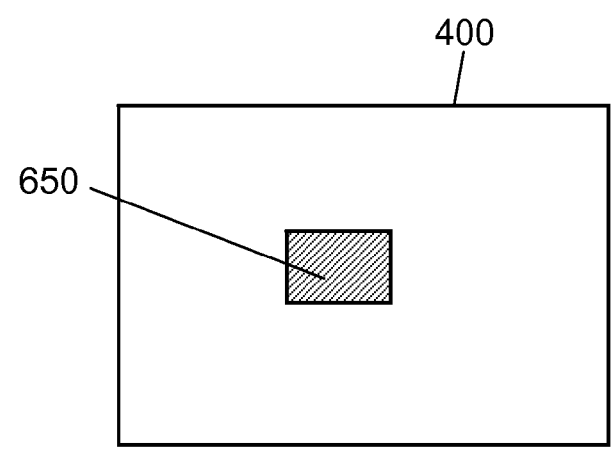
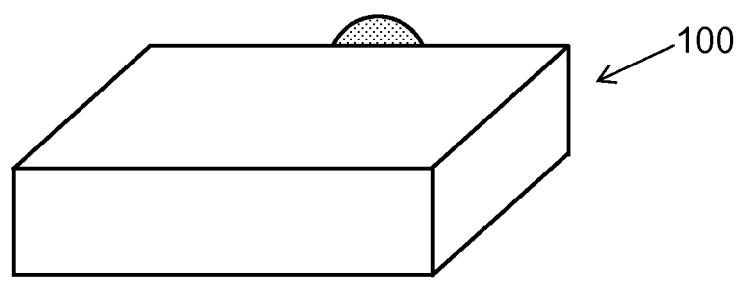

PROJECTION DISPLAY DEVICE

This application is a US National Phase application of PCT International Application PCT/JP2011/071549.

TECHNICAL FIELD

The present invention relates a projection display device including an optical modulation element configured to modulate light outputting from a light source, and a projection unit configured to project light modulated by the optical modulation element onto a projection screen.

BACKGROUND ART

A conventional projection display device including an optical modulation element that modulates light outputting from a light source and a projection unit that projects light modulated by the optical modulation element onto a projection screen is known.

In an initial state, since an image projected on a projection screen is out of focus, the image projected on the projection screen must be focused. For example, a projection display device that projects a guidance image that guides focus adjustment onto a projection screen is known.

CITATION LIST

Patent Literature

PLT 1: Unexamined Japanese Patent Publication No. 2010-117514

SUMMARY OF THE INVENTION

A projection display device includes an optical modulation element configured to modulate light outputting from a light source, and a projection unit configured to project light modulated by the optical modulation element on a projection screen. The projection display device includes an element control unit that controls the optical modulation element to display a test pattern image, an acquiring unit that acquires an image obtained by capturing the test pattern image from an image capture element that captures the test pattern image projected on the projection screen, and an adjusting unit that adjusts an image projected on the projection screen on the basis of the capture image acquired by the acquiring unit. The element control unit controls the optical modulation element such that a guidance image that guides focus adjustment of the image projected on the projection screen is displayed.

Another projection display device includes an optical modulation element configured to modulate light outputting from a light source, and a projection unit configured to project light modulated by the optical modulation element on a projection screen. The projection display device includes an element control unit controls the optical modulation element to display a guidance image that guides focus adjustment of an image projected on the projection screen. The guidance image includes an image representing the degree of focusing in each of a plurality of regions that divide the projection screen.

BRIEF DESCRIPTION OF DRAWINGS

FIG. 27 is a diagram for explaining still another embodiment.

FIG. 28 is a diagram for explaining still another embodiment.

DESCRIPTION OF EMBODIMENTS

Figure 1:
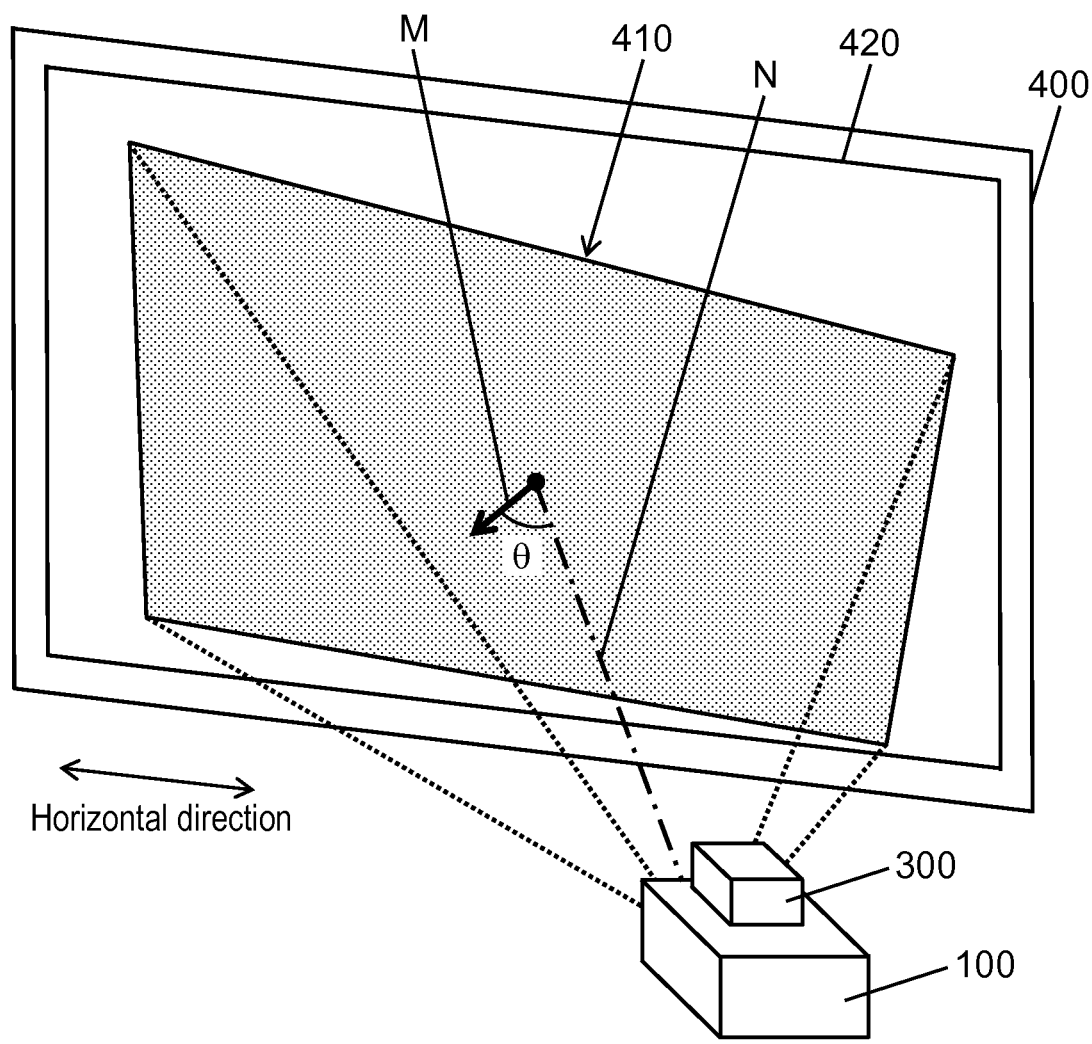
FIG. 1 is a diagram showing an outline of projection display device 100 according to a first embodiment.

A projection display device according to an embodiment of the present invention will be described below with reference to the drawings. In the following descriptions of the drawings, the same or similar reference symbols denote the same or similar parts.

The drawings are typical drawings, and it should be noted that ratios dimensions or the like of are different from actual ratios of dimensions. Thus, concrete dimensions and the like should be determined in consideration of the following explanation. The drawings include parts that have different relation between dimensions and different ratios, as a matter of course.

Outline of Embodiment

Firstly, a projection display device according to an embodiment includes an optical modulation element configured to modulate light outputting from a light source, and a projection unit configured to project light modulated by the optical modulation element onto a projection screen. The projection display device includes an element control unit that controls the optical modulation element to display a test pattern image, an acquiring unit that acquires an image obtained by capturing the test pattern image from an image capture element that captures the test pattern image projected on the projection screen, and an adjusting unit that adjusts an image projected on the projection screen on the basis of the capture image acquired by the acquiring unit. The element control unit controls the optical modulation element such that, after the image projected on the projection screen is adjusted, a guidance image that guides focus adjustment of the image projected on the projection screen is displayed.

In the embodiment, the element control unit displays a guidance image that guides focus adjustment of an image projected on the projection screen after the image projected on the projection screen is adjusted. Thus, while reducing the trouble of image adjustment, a sense of anxiety given to a user about whether focus is actually achieved is reduced.

The image adjustment includes adjustment of a shape of image, adjustment of focusing of image, adjustment of zooming of image, and the like.

The test pattern image is a shape adjustment image that configures at least a part of each of three or more line segments configuring three or more intersections. An image obtained by capturing the shape adjustment image output from the image capture element along a predetermined line is acquired. The acquiring unit acquires an image obtained by capturing the shape adjustment image output from the image capture element along a predetermined line. The projection display device includes a calculation unit that specifies, on the basis of the capture image acquired by the acquiring unit, three or more intersections from three or more line segments included in the capture image and calculates a positional relation between the projection display device and the projection screen on the basis of the three or more intersections. The adjusting unit adjusts a shape of an image projected on the projection screen on the basis of the positional relation between the projection display device and the projection screen. The three or more line segments included in the shape adjustment image has inclinations with respect to the predetermined line.

Secondly, a projection display device according to the embodiment includes an optical modulation element configured to modulate light outputting from a light source, and a projection unit configured to project light modulated by the optical modulation element onto a projection screen. The projection display device includes an element control unit that controls the optical modulation element such that a guidance image that guides focus adjustment of the image projected on the projection screen is displayed. The guidance image includes an image representing the degree of focusing in each of a plurality of regions that divide the projection screen.

In the embodiment, the element control unit controls the optical modulation element to display a guidance image including an image showing the degree of focusing in each of a plurality of regions that divide a projection screen. Thus, a sense of anxiety given to a user about whether focus is actually achieved is reduced.

The guidance image includes a diagram showing whether or not focus is adjusted. The guidance image includes a character representing whether or not focus is adjusted. The projection display device includes an adjusting tool that adjusts focus of an image projected on the projection screen depending on an operation in a predetermined direction. The guidance image includes an image representing a direction in which the adjusting tool should be operated.

First Exemplary Embodiment

Outline of Projection Display Device

A projection display device according to a first embodiment will be described below with reference to the drawings. FIG. 1 is a diagram showing an outline of projection display device 100 according to the first embodiment.

As shown in FIG. 1, in projection display device 100, image capture element 300 is arranged. Projection display device 100 projects image light on projection screen 400.

Image capture element 300 is configured to capture an image of projection screen 400. More specifically, image capture element 300 is configured to detect reflected light of the image light projected on projection screen 400 by projection display device 100. For example, image capture element 300 outputs a capture image to projection display device 100 along a predetermined line. Image capture element 300 may be incorporated in projection display device 100 or may be arranged independently of projection display device 100.

Projection screen 400 includes a screen or the like. A region (projectable region 410) on which projection display device 100 can project image light is formed on projection screen 400. Projection screen 400 has display frame 420 configured by an outer frame of a screen or the like.

The first embodiment illustrates a case in which optical axis N of projection display device 100 does not coincide with normal line M of projection screen 400. For example, a case in which optical axis N and normal line M form angle θ is illustrated.

More specifically, in the first embodiment, since optical axis N and normal line M do not coincide with each other, projectable region 410 (image displayed on projection screen 400) is distorted. In the first embodiment, a method of correcting the distortion of projectable region 410 will be mainly described below.

(Configuration of Projection Display Device)

Figure 2:
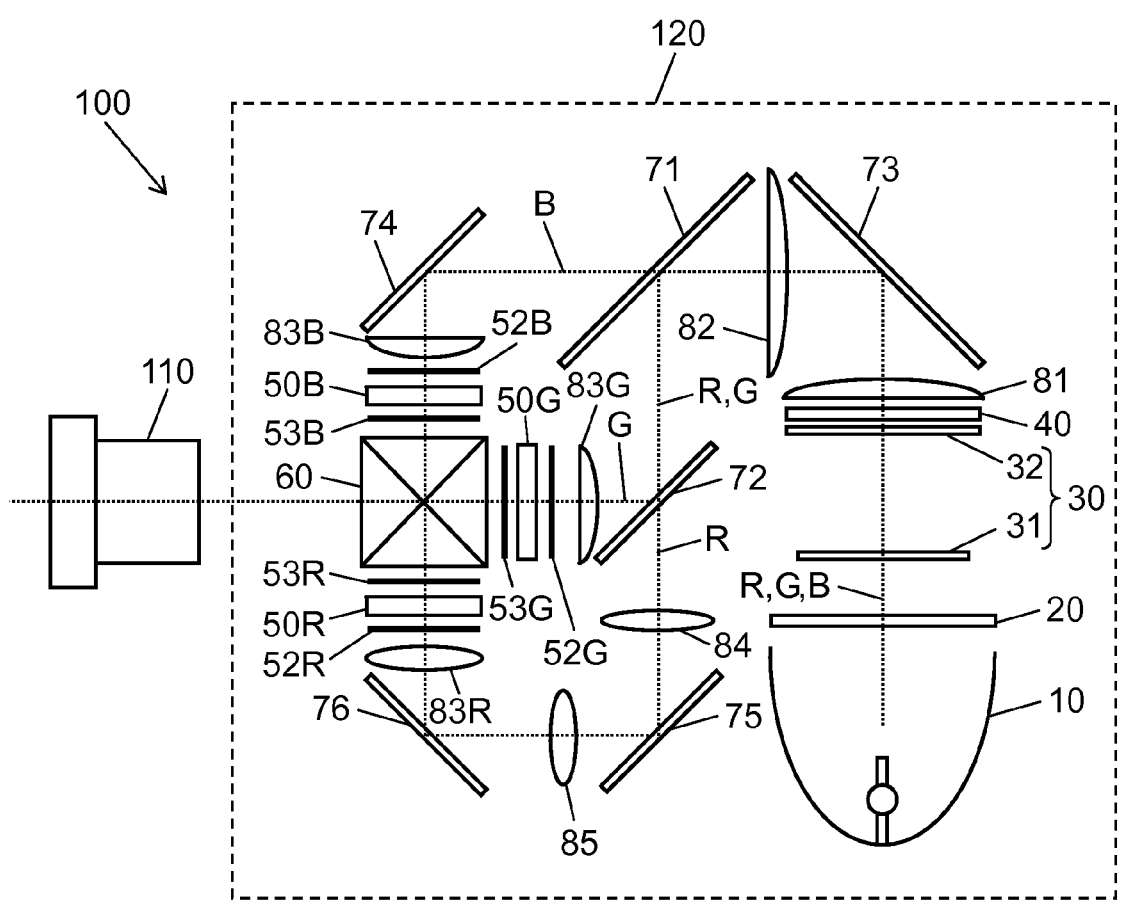
FIG. 2 is a diagram showing a configuration of projection display device 100 according to the first embodiment.

A projection display device according to the first embodiment will be described below with reference to the drawings. FIG. 2 is a diagram showing a configuration of projection display device 100 according to the first embodiment.

As shown in FIG. 2, projection display device 100 has projection unit 110 and illumination device 120.

Projection unit 110 projects image light outputting from illumination device 120 on a projection screen (not shown) or the like.

Firstly, illumination device 120 includes light source 10, UV/IR cut filter 20, fly-eye lens unit 30, PBS array 40, a plurality of liquid crystal panels 50 (liquid crystal panel 50R, liquid crystal panel 50G, and liquid crystal panel 50B), and cross-die clock prism 60.

Light source 10 is a light source (for example, a UHP lamp or a xenon lamp) that emits white light. More specifically, the white light outputting from light source 10 includes red-component light R, green-component light G, and blue-component light B.

UV/IR cut filter 20 transmits visible light components (red-component light R, green-component light G, and blue-component light B). UV/IR cut filter 20 shields an infrared light component and an ultraviolet light component.

Fly-eye lens unit 30 makes light outputting from light source 10 uniform. More specifically, fly-eye lens unit 30 includes fly-eye lens 31 and fly-eye lens 32. Each of fly-eye lens 31 and fly-eye lens 32 includes a plurality of microlenses. Each of the microlenses converges light outputting from light source 10 such that light outputting from light source 10 is irradiated on an entire surface of liquid crystal panel 50.

PBS array 40 equalizes polarization conditions of light outputting from fly-eye lens unit 30. For example, PBS array 40 equalizes the light outputting from fly-eye lens unit 30, to S-polarization light (or P-polarization light).

Liquid crystal panel 50R modulates red-component light R on the basis of red output signal $R_{out}$. On a side on which light is incident on liquid crystal panel 50R, incident-side polarization plate 52R that transmits light having one polarization direction (for example, S-polarization light) and shields light having another polarization direction (for example, P-polarization light) is arranged. On a side on which light outputs from liquid crystal panel 50R, output-side polarization plate 53R that shields light having one polarization direction (for example, S-polarization light) and transmits light having another polarization direction (for example, P-polarization light) is arranged.

Liquid crystal panel 50G modulates green-component light G on the basis of green output signal $G_{out}$. On a side on which light is incident on liquid crystal panel 50G, incident-side polarization plate 52G that transmits light having one polarization direction (for example, S-polarization light) and shields light having another polarization direction (for example, P-polarization light) is arranged. On the other hand, on a side on which light outputs from liquid crystal panel 50G, output-side polarization plate 53G that shields light having one polarization direction (for example, S-polarization light) and transmits light having another polarization direction (for example, P-polarization light) is arranged.

Liquid crystal panel 50B modulates blue-component light B on the basis of blue output signal $B_{out}$. On a side on which light is incident on liquid crystal panel 50B, incident-side polarization plate 52B that transmits light having one polarization direction (for example, S-polarization light) and shields light having another polarization direction (for example, P-polarization light) is arranged. On the other hand, on a side on which light outputs from liquid crystal panel 50B, output-side polarization plate 53B that shields light having one polarization direction (for example, S-polarization light) and transmits light having another polarization direction (for example, P-polarization light) is arranged.

Note that red output signal $R_{out}$, green output signal $G_{out}$, and blue output signal $B_{out}$ configure an image output signal. The image output signal is a signal for each of a plurality of pixels configuring one frame.

On each of liquid crystal panels 50, a compensating plate (not shown) that improves a contrast ratio and a transmittance may be arranged. Each of the polarization plates may have a pre-polarization plate that reduces an amount of light being incident on the polarization plate or a heat load.

Cross-die clock prism 60 configures a color composition unit that composes lights outputting from liquid crystal panel 50R, liquid crystal panel 50G, and liquid crystal panel 50B. Composite light outputting from cross-die clock prism 60 is guided to projection unit 110.

Secondly, illumination device 120 has a mirror group (mirror 71 to mirror 76) and a lens group (lens 81 to lens 85).

Mirror 71 is a die clock mirror that transmits blue-component light B and reflects red-component light R and green-component light G. Mirror 72 is a die clock mirror that transmits red-component light R and reflects green-component light G. Mirror 71 and Mirror 72 configure a color separation unit that separates red-component light R, green-component light G, and blue-component light B from each other.

Mirror 73 reflects red-component light R, green-component light G, and blue-component light B and guides red-component light R, green-component light G, and blue-component light B to a mirror 71 side. Mirror 74 reflects blue-component light B and guides blue-component light B to a liquid crystal panel 50B side. Mirror 75 and mirror 76 reflect red-component light R and guides red-component light R to a liquid crystal panel 50R side.

Lens 81 is a condenser lens that converges light outputting from PBS array 40. Lens 82 is a condenser lens that converges light reflected by mirror 73.

Lens 83R changes red-component light R into almost parallel light such that red-component light R is irradiated on liquid crystal panel 50R. Lens 83G changes green-component light G into almost parallel light such that green-component light G is irradiated on liquid crystal panel 50G.

Lens 83B changes blue-component light B into almost parallel light such that blue-component light B is irradiated on liquid crystal panel 50B.

Lens 84 and lens 85 are relay lenses that forms an image of red-component light R on liquid crystal panel 50R while suppressing red-component light R from being enlarged.

(Configuration of Control Unit)

Figure 3:
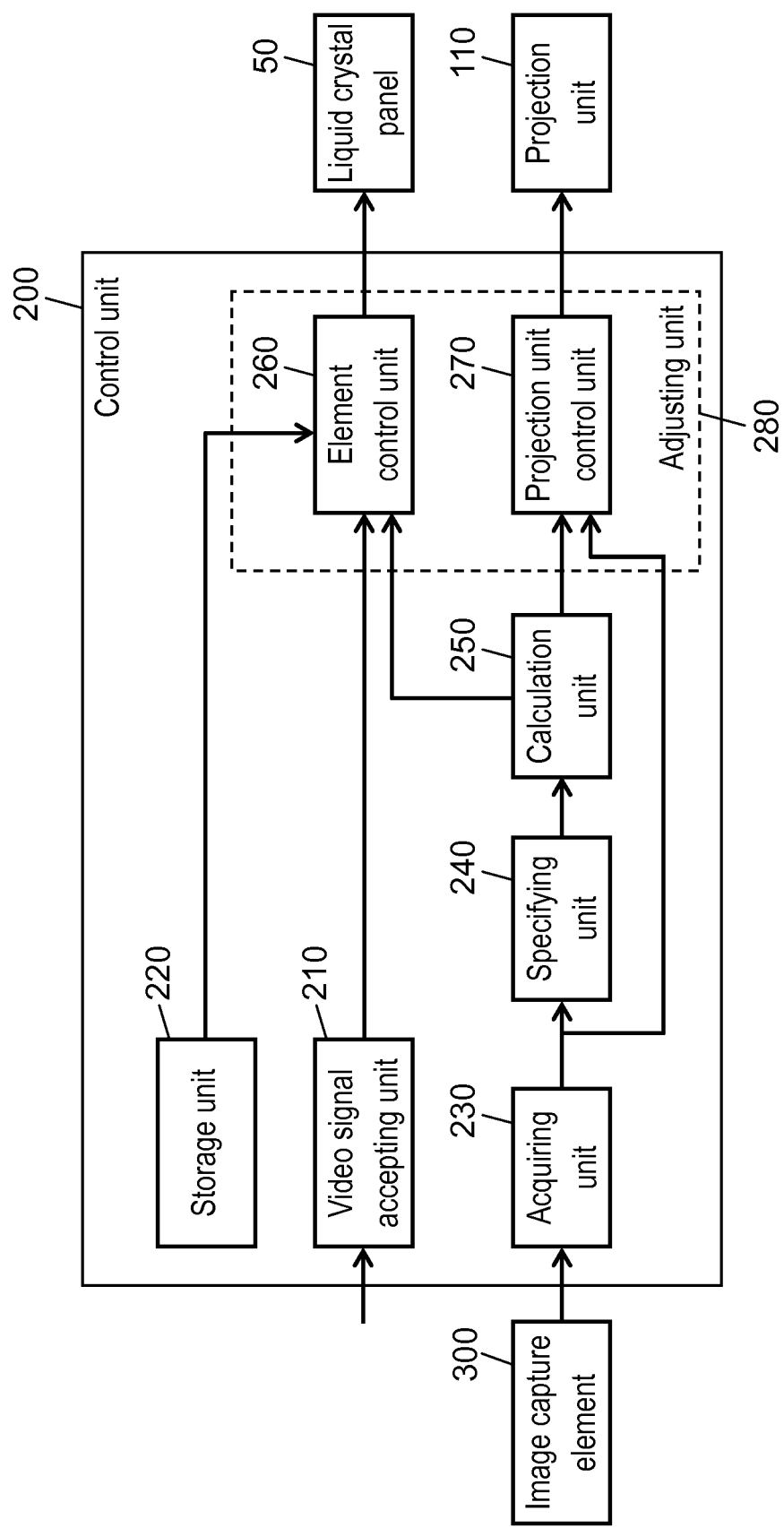
FIG. 3 is a block diagram showing control unit 200 according to the first embodiment.

A control unit according to the first embodiment will be described below with reference to the drawings. FIG. 3 is a block diagram showing control unit 200 according to the first embodiment. Control unit 200 is arranged in projection display device 100 to control projection display device 100.

Control unit 200 converts an image input signal into an image output signal. The image input signal includes red input signal $R_{in}$, green input signal $G_{in}$, and blue input signal $B_{in}$. An image output signal includes red output signal $R_{out}$, green output signal $G_{out}$, and blue output signal $B_{out}$. The image input signal and the image output signal are signals input to each of a plurality of pixels configuring one frame.

As shown in FIG. 3, control unit 200 includes image signal accepting unit 210, storage unit 220, acquiring unit 230, specifying unit 240, calculation unit 250, element control unit 260, and projection unit adjusting unit 270.

Image signal accepting unit 210 accepts an image input signal from an external device (not shown) such as a DVD or a TV tuner.

Storage unit 220 stores various pieces of information. More specifically, the storage unit 220 stores, as test pattern images, a frame detection pattern image used to detect display frame 420, a focus adjusting image used to adjust focus, and a shape adjustment image used to calculate a positional relation between projection display device 100 and projection screen 400. Storage unit 220 stores a guidance image that guides focus adjustment of an image projected on projection screen 400. Alternatively, storage unit 220 may store an exposure adjusting image used to adjust an exposure value.

Figure 4:
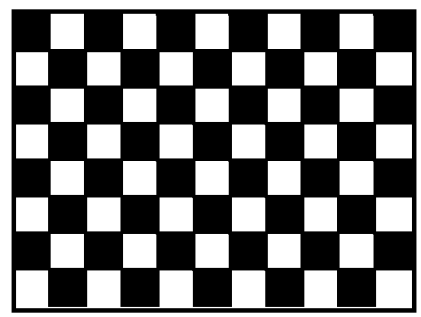
FIG. 4 is a diagram showing an example of a focus adjustment image according to the first embodiment.
Figure 5:
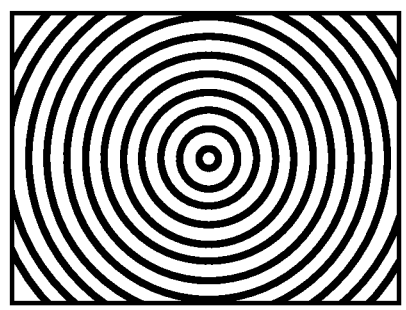
FIG. 5 is a diagram showing an example of the focus adjustment image according to the first embodiment.

Focus adjustment image is an image for which edge detection can be easily performed. For example, the focus adjustment image, as shown in FIG. 4, is an image on which white rectangles and black rectangles are arranged in the form of a grating. Alternatively, the focus adjustment image, as shown in FIG. 5, white coaxial circles and black coaxial circles are alternately arranged. Alternatively, the focus adjustment image may be an image on which white stripes and black stripes are alternately arranged.

The shape adjustment image is an image that configures at least a part of each of three or more line segments configuring three or more intersections. The three or more line segments have inclinations with respect to the predetermined line.

As described above, image capture element 300 outputs a capture image along a predetermined line. For example, the predetermined line is a row of pixels in a horizontal direction, and the direction of the predetermined line is horizontal.

An example of the shape adjustment image will be described below with reference to FIG. 6 to FIG. 9. As shown in FIG. 6 to FIG. 9, the shape adjustment image is an image that configures at least a part of four line segments ($L_s1$ to $L_s4$) configuring four intersections ($P_s1$ to $P_s4$). In the first embodiment, four line segments ($L_s1$ to $L_s4$) are expressed by differences (edges) between thicknesses or contrasts.

Figure 6:
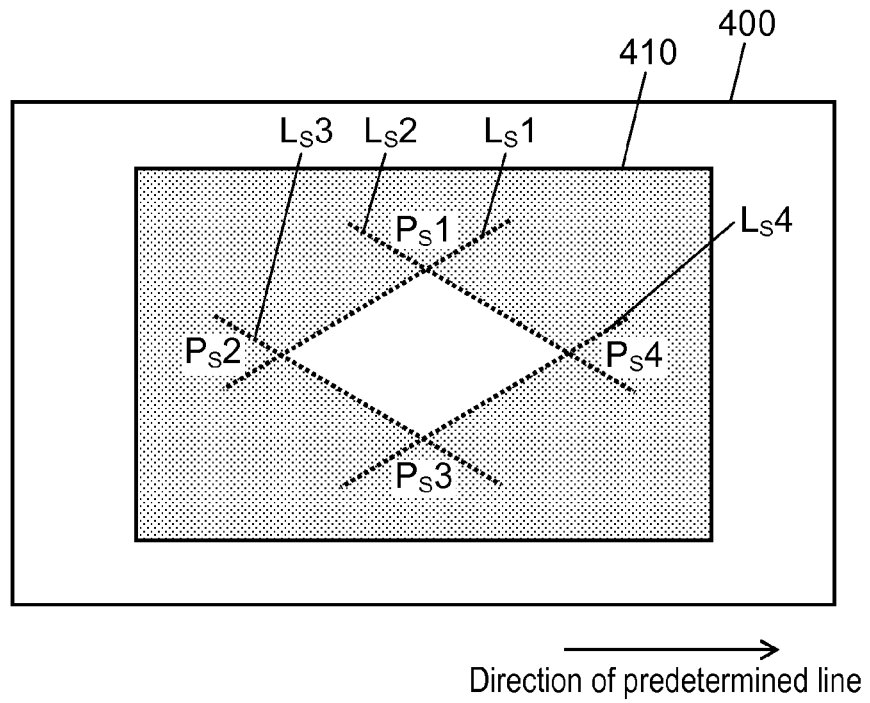
FIG. 6 is a diagram showing an example of a stored shape-adjustment-image image according to the first embodiment.

More specifically, as shown in FIG. 6, the shape adjustment image may be an outline rhombus on a black background. In this case, the four sides of the outline rhombus configure at least a part of four line segments ($L_s1$ to $L_s4$). Note that four line segments ($L_s1$ to $L_s4$) have inclinations with respect to a predetermined line (horizontal direction).

Figure 7:
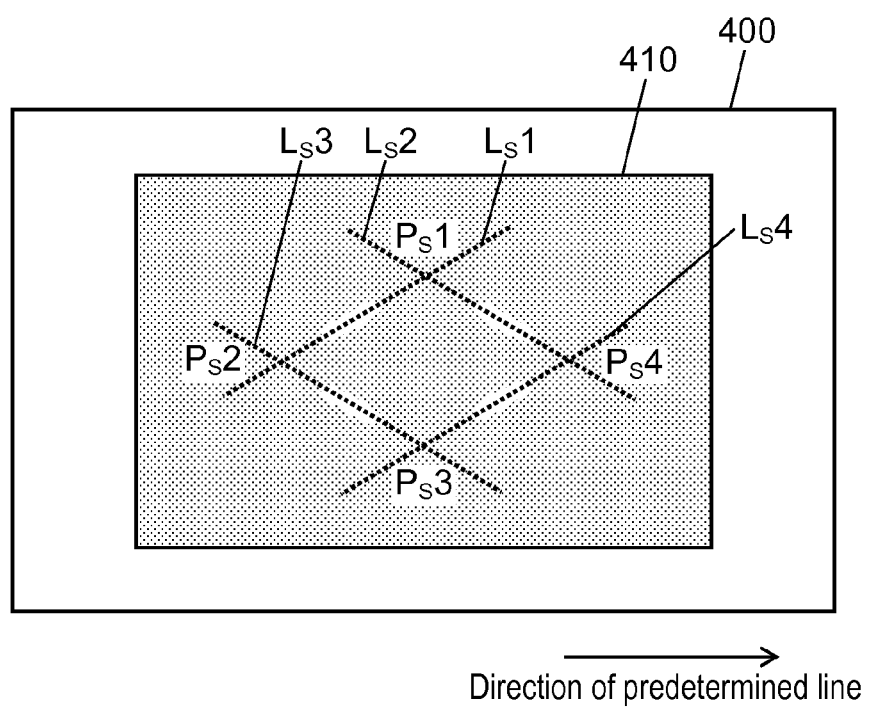
FIG. 7 is a diagram showing an example of the stored shape-adjustment-image image according to the first embodiment.

Alternatively, as shown in FIG. 7, the shape adjustment image may be an outline line segment on a black background. The outline line segment partially configures the four sides of an outline rhombus shown in FIG. 4. In this case, the outline line segment configures at least a part of four line segments ($L_s1$ to $L_s4$). Note that four line segments ($L_s1$ to $L_s4$) have inclinations with respect to a predetermined line (horizontal direction).

Figure 8:
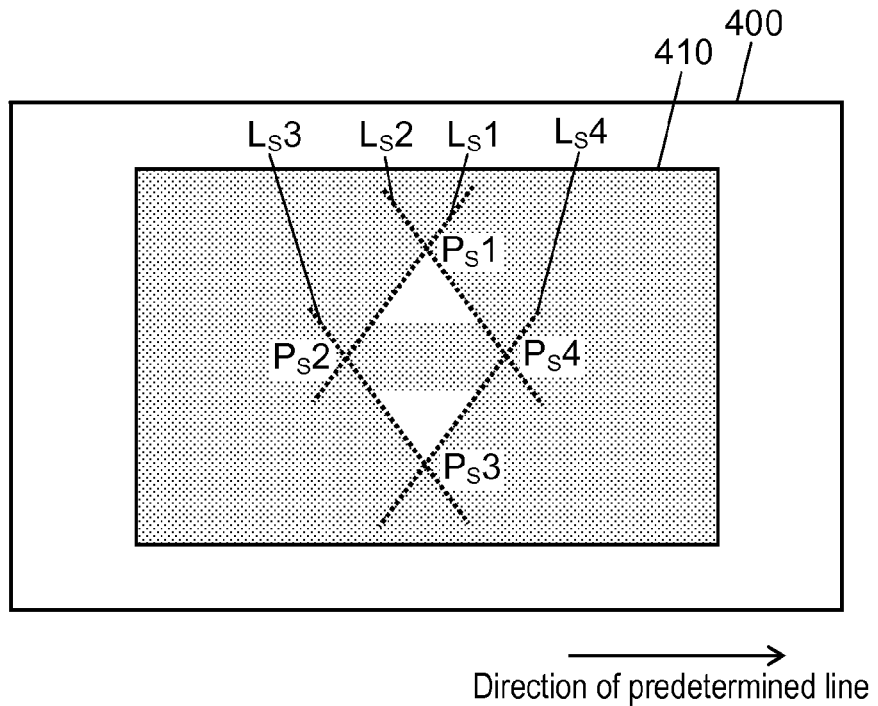
FIG. 8 is a diagram showing an example of the stored shape-adjustment-image image according to the first embodiment.

Alternatively, as shown in FIG. 8, the shape adjustment image may be a pair of outline triangles on a black background. In this case, the two sides of the outline triangles configure at least a part of four line segments ($L_s1$ to $L_s4$). Note that four line segments ($L_s1$ to $L_s4$) have inclinations with respect to a predetermined line (horizontal direction).

Figure 9:
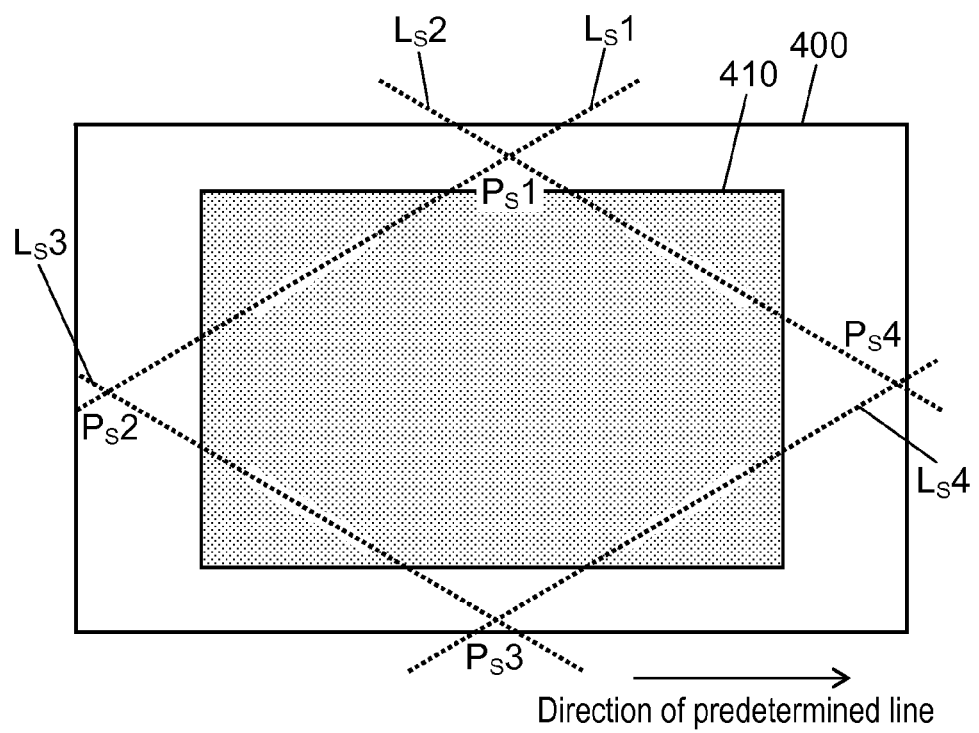
FIG. 9 is a diagram showing an example of the stored shape-adjustment-image image according to the first embodiment.

Alternatively, as shown in FIG. 9, the shape adjustment image may be an outline line segment on a black background. In this case, the outline line segment configures at least a part of four line segments ($L_s1$ to $L_s4$). As shown in FIG. 9, four intersections ($P_s1$ to $P_s4$) configured by four line segments ($L_s1$ to $L_s4$) may be arranged outside projectable region 410. Note that four line segments ($L_s1$ to $L_s4$) have inclinations with respect to a predetermined line (horizontal direction).

Acquiring unit 230 acquires a capture image output from image capture element 300 along the predetermined line. For example, acquiring unit 230 acquires an image obtained by capturing a frame detection pattern image output from image capture element 300 along the predetermined line. Acquiring unit 230 acquires an image obtained by capturing a focus adjustment image output from image capture element 300 along the predetermined line. Acquiring unit 230 acquires an image obtained by capturing a shape adjustment image output from image capture element 300 along the predetermined line. Alternatively, acquiring unit 230 acquires an image obtained by capturing an exposure adjustment image output from image capture element 300 along the predetermined line.

Specifying unit 240 specifies three line segments included in the capture image on the basis of the capture image acquired for each predetermined line by acquiring unit 230. Subsequently, specifying unit 240 acquires three or more intersections included in the capture image on the basis of the three line segments included in the capture image.

More specifically, specifying unit 240, by the following procedures, acquires three or more intersections included in the capture image. A case in which the shape adjustment image is an image (outline rhombus) shown in FIG. 4 is illustrated here.

Figure 10:
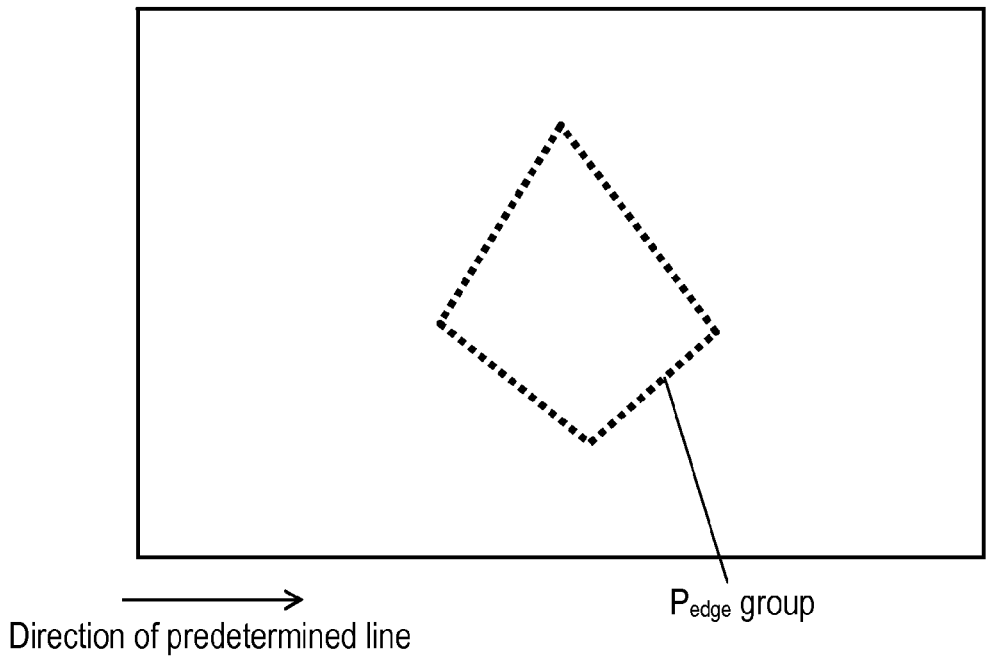
FIG. 10 is a diagram showing an example of a captured shape-adjustment-image image according to the first embodiment.

Firstly, specifying unit 240, as shown in FIG. 10, on the basis of the capture image acquired for each predetermined line by acquiring unit 230, acquires a dot group $P_{edge}$ having differences (edges) between thicknesses or contrasts. More specifically, specifying unit 240 specifies dot group $P_{edge}$ corresponding to the four sides of outline rhombus of the shape adjustment image.

Figure 11:
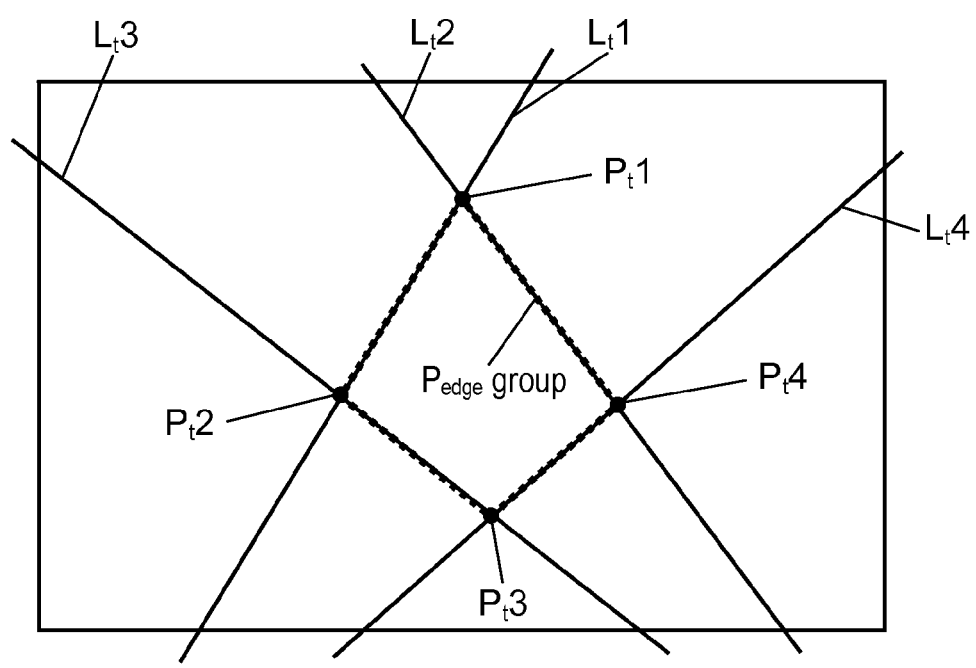
FIG. 11 is a diagram showing an example of the captured shape-adjustment-image image according to the first embodiment.

Secondly, specifying unit 240, as shown in FIG. 11, on the basis of dot group $P_{edge}$, specifies four line segments ($L_t1$ to $L_t4$) included in the capture image. More specifically, specifying unit 240 specifies four line segments ($L_t1$ to $L_t4$) corresponding to four line segments ($L_s1$ to $L_s4$) included in the shape adjustment image.

Thirdly, specifying unit 240, as shown in FIG. 11, on the basis of four segments ($L_t1$ to $L_t2$), specifies four intersections ($P_t1$ to $P_t4$) included in the capture image. More specifically, specifying unit 240 specifies four intersections ($P_t1$ to $P_t4$) corresponding to four intersections ($P_s1$ to $P_s4$) included in the shape adjustment image.

Calculation unit 250 calculates a positional relation between projection display device 100 and projection screen 400 on the basis of three or more intersections (for example, $P_s1$ to $P_s4$) included in the shape adjustment image and three intersections (for example, $P_t1$ to $P_t4$) included in the capture image. More specifically, calculation unit 250 calculates a shift length between optical axis N of projection display device 100 (projection unit 110) and normal line M of projection screen 400.

In the following description, the shape adjustment image stored in storage unit 220 is referred to as a stored shape-adjustment-image image. The shape adjustment image included in the capture image is referred to as a captured shape-adjustment-image image. The shape adjustment image projected on projection screen 400 is referred to as a projected shape-adjustment-image image.

Firstly, the calculation unit 250 calculates coordinates of four intersections ($P_u1$ to $P_u4$) included in the projected shape-adjustment-image image. In this case, an explanation will be made with reference to intersection $P_s1$ of the stored shape-adjustment-image image, intersection $P_t1$ of the captured shape-adjustment-image image, and intersection $P_u1$ of the projected shape-adjustment-image image. Intersection $P_s1$, intersection $P_t1$, and intersection $P_u1$ correspond to each other, respectively.

Figure 12:
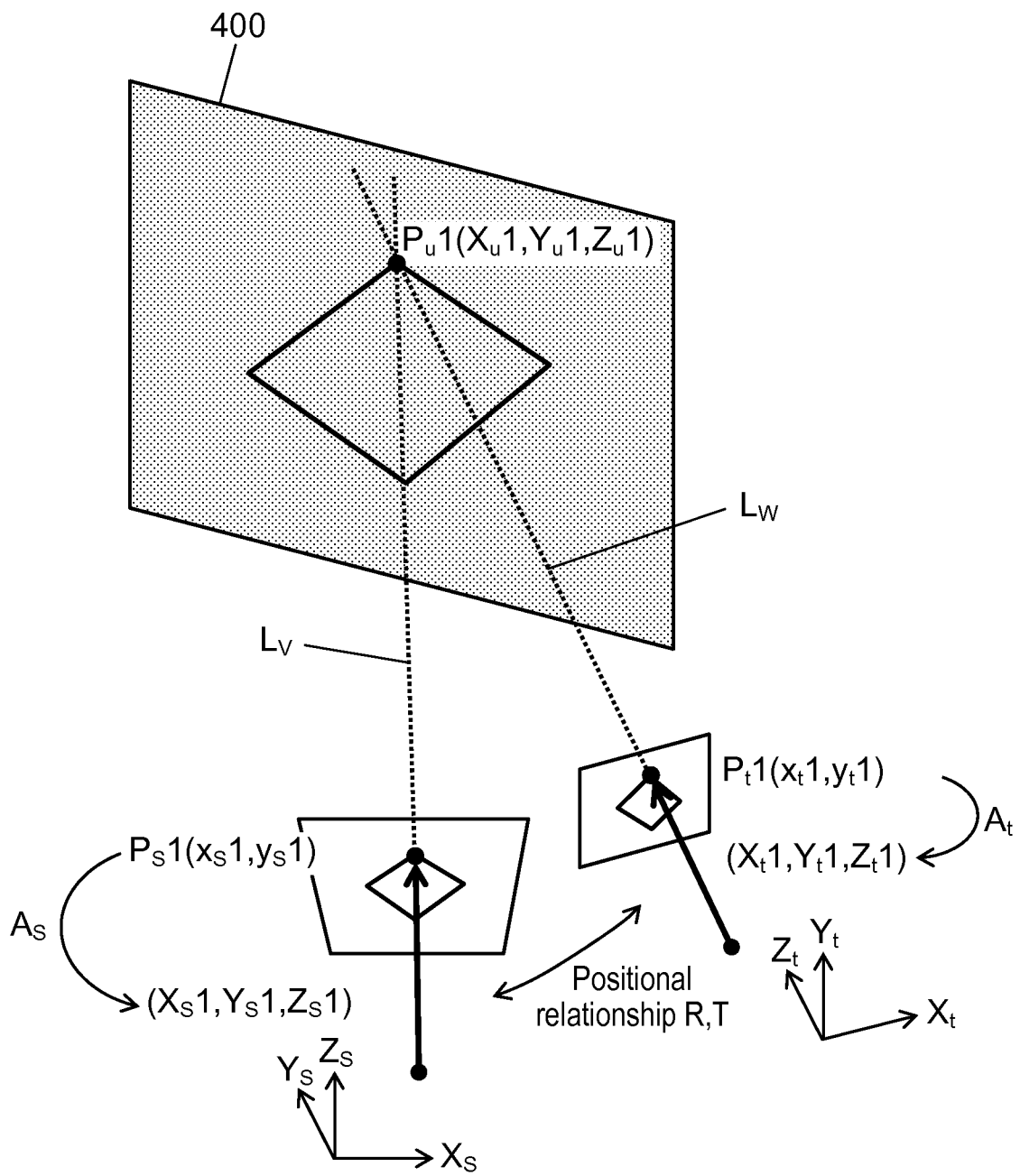
FIG. 12 is a diagram for explaining a method of calculating an intersection included in a projected shape-adjustment-image image according to the first embodiment.

In the following description, a method of calculating coordinates ($X_u1, Y_u1, Z_u1$) of intersection $P_u1$ will be described below with reference to FIG. 12. It should be noted that coordinates ($X_u1, Y_u1, Z_u1$) of intersection $P_u1$ are coordinates in a three-dimensional space having focal point $O_s$ of projection display device 100 as an original point.

(1) Calculation unit 250 converts coordinates ($x_s1, y_s1$) of intersection $P_s1$ in a two-dimensional plane of the stored shape-adjustment-image image into coordinates ($X_s1, Y_s1,$ $Z_s1$) of intersection $P_s1$ in the three-dimensional space having focal point $O_s$ of projection display device 100 as an original point. More specifically, coordinates ($X_s1, Y_s1, Z_s1$) of intersection $P_s1$ are expressed by the following expression.

$$\begin{bmatrix} Xs1 \\ Ys1 \\ Zs1 \end{bmatrix} = As \begin{bmatrix} xs1 \\ ys1 \\ 1 \end{bmatrix} \qquad \text{expression (1)}$$

Note that As denotes a 3×3 transformation matrix that can be acquired in advance by a pre-process such as calibration. More specifically, As denotes a known parameter.

In this case, a plane perpendicular to an optical axis direction of projection display device 100 is expressed by $X_s$ axis and $Y_s$ axis, and an optical axis direction of projection display device 100 is expressed by $Z_s$ axis.

Similarly, calculation unit 250 converts coordinates ($x_t1, y_t1$) of intersection $P_t1$ in a two-dimensional plane of the captured shape-adjustment-image image into coordinates ($X_t1, Y_t1, Z_t1$) of intersection $P_t1$ in a three-dimensional space having focal point $O_t$ of image capture element 300 as an original point.

$$\begin{bmatrix} Xt1 \\ Yt1 \\ Zt1 \end{bmatrix} = At \begin{bmatrix} xt1 \\ yt1 \\ 1 \end{bmatrix} \qquad \text{expression (2)}$$

Note that At denotes a 3×3 transformation matrix that can be acquired in advance by a pre-process such as calibration. More specifically, At denotes a known parameter.

In this case, a plane perpendicular to the optical axis direction of image capture element 300 is expressed by $X_t$ axis and $Y_t$ axis, and a direction (capture direction) of image capture element 300 is expressed by $Z_t$ axis. In the above coordinate space, it should be noted that an inclination (vector) of the direction (capture direction) of image capture element 300 is known.

(2) Calculation unit 250 calculates an expression of straight line $L_v$ connecting intersection $P_s1$ and intersection $P_u1$. Calculation unit 250 calculates an expression of straight line $L_w$ connecting intersection $P_t1$ and intersection $P_u1$. The expression between straight line $L_v$ and straight line $L_w$ is expressed as follows.

$$Lv = \begin{bmatrix} xs \\ ys \\ zs \end{bmatrix} = Ks \begin{bmatrix} Xs1 \\ Ys1 \\ Zs1 \end{bmatrix} \qquad \text{expression (3)}$$

$$Lw = \begin{bmatrix} xt \\ yt \\ zt \end{bmatrix} = Kt \begin{bmatrix} Xt1 \\ Yt1 \\ Zt1 \end{bmatrix} \qquad \text{expression (4)}$$

Note that $K_s$ and $K_t$=parameters.

(3) Calculation unit 250 converts straight line $L_w$ into straight line $L_w'$ in the three-dimensional space having the focal point $O_s$ of projection display device 100 as an original point. Straight line $L_w'$ is expressed by the following expression.

$$Lw' = \begin{bmatrix} xt' \\ yt' \\ zt' \end{bmatrix} = KtR \begin{bmatrix} Xt1 \\ Yt1 \\ Zt1 \end{bmatrix} + T \qquad \text{expression (5)}$$

Since the optical axis of projection display device 100 and the direction (capture direction) of image capture element 300 are known, parameter R representing a rotating component is known. Similarly, since relative positions of projection display device 100 and image capture element 300 are known, parameter T representing a translation component is also known.

(4) Calculation unit 250, on the basis of Expression (3) and Expression (5), calculates parameters $K_s$ and $K_t$ at intersection (i.e., intersection $P_u1$) between straight line $L_v$ and straight line $L_w'$. Subsequently, calculation unit 250, on the basis of coordinates ($X_s1, Y_s1, Z_s1$) at intersection $P_s1$ and $K_s$, calculates coordinates ($X_u1, Y_u1, Z_u1$) at intersection $P_u1$. Alternatively, calculation unit 250, on the basis of coordinates ($X_t1, Y_t1, Z_t1$) at intersection $P_t1$ and $K_t$, calculates coordinates ($X_u1, Y_u1, Z_u1$) at intersection $P_u1$.

For this reason, calculation unit 250 calculates coordinates ($X_u1, Y_u1, Z_u1$) at intersection $P_u1$. Similarly, calculation unit 250 calculates coordinates ($X_u2, Y_u2, Z_u2$) at intersection $P_u2$, coordinates ($X_u3, Y_u3, Z_u3$) at intersection $P_u3$, and coordinates ($X_u4, Y_u4, Z_u4$) at intersection $P_u4$.

Secondly, calculation unit 250 calculates a vector of normal line M of projection screen 400. More specifically, calculation unit 250 calculates the vector of normal line M of projection screen 400 by using coordinates at least three intersections of intersections $P_u1$ to $P_u4$. An expression of projection screen 400 is expressed by the following expression, and parameters $k_1$, $k_2$, and $k_3$ express the vector of normal line M of projection screen 400.

$$k_1x + k_2y + k_3z + k_4 > 0 \qquad \text{expression (6)}$$

Note that $k_1$, $k_2$, $k_3$, $k_4$=predetermined coefficients.

In this manner, calculation unit 250 calculates a shift length between optical axis N of projection display device 100 and normal line M of projection screen 400. More specifically, calculation unit 250 can calculate a positional relation between projection display device 100 and projection screen 400.

In the first embodiment, specifying unit 240 and calculation unit 250 are separately described. However, specifying unit 240 and calculation unit 250 may be regarded as one configuration. For example, calculation unit 250 may have the function of specifying unit 240.

Returning to FIG. 3, element control unit 260 converts an image input signal into an image output signal, and controls liquid crystal panel 50 on the basis of the image output signal. For example, element control unit 260 controls liquid crystal panel 50 to display a frame detection pattern image, a focus adjustment image, a shape adjustment image, or a guidance image. Alternatively, element control unit 260 may control liquid crystal panel 50 to display an exposure adjustment image.

It should be noted that element control unit 260 controls liquid crystal panel 50 to display the guidance image after an image projected on projection screen 400 is adjusted.

Element control unit 260 has the following functions. More specifically, element control unit 260 has a function that, on the basis of the positional relation between projection display device 100 and projection screen 400, automatically corrects a shape of the image projected on projection screen 400 (shape adjustment). More specifically, element control unit 260 has a function that, on the basis of the positional relation between projection display device 100 and projection screen 400, automatically performs trapezoidal correction.

Projection unit adjusting unit 270 controls a lens group arranged in projection unit 110. Firstly, projection unit adjusting unit 270 sets projectable region 410 in display frame 420 arranged on projection screen 400 by shifting the lens group arranged in projection unit 110. More specifically, projection unit adjusting unit 270, on the basis of an image obtained by capturing the frame detection pattern image acquired by acquiring unit 230, controls the lens group arranged in projection unit 110 to set projectable region 410 in display frame 420.

Secondly, projection unit adjusting unit 270 adjusts a focus of the image projected on projection screen 400 by shifting the lens group arranged in projection unit 110 (focus adjustment). More specifically, projection unit adjusting unit 270, on the basis of an image obtained by capturing a focus adjustment image acquired by acquiring unit 230, controls the lens group arranged in projection unit 110 such that a focus value of the image projected on projection screen 400 is a maximum value.

Although not mentioned especially here, projection display device 100 may have an adjusting tool to manually adjust a zooming operation. Projection display device 100 may have an adjusting tool to manually adjust focusing. By operating the adjusting tool, the lens group arranged in projection unit 110 shifts.

Element control unit 260 and projection unit adjusting unit 270 configure adjusting unit 280 that adjusts an image projected on projection screen 400.

In this case, projection display device 100 may specify a line segment included in the shape adjustment image for an entire area of the shape adjustment image and calculate a positional relation between projection display device 100 and projection screen 400 (batch processing mode). More specifically, in the batch processing mode, image capture element 300 captures an entire area of the shape adjustment image in a state in which a focus of an entire area of projectable region 410 is adjusted, and projection display device 100, on the basis of an image obtained by capturing an entire area of the shape adjustment image, specifies three or more line segments included in the shape adjustment image.

Alternatively, projection display device 100 may specify a line segment included in the shape adjustment image for each of a plurality of image regions divided to partially include the shape adjustment image, and calculate a positional relation between projection display device 100 and projection screen 400 (divisional processing mode). More specifically, in the divisional processing mode, image capture element 300 captures the shape adjustment image for each of the plurality of regions in a state in which a focus is adjusted for each of the plurality of image regions, and projection display device 100, on the basis of an image obtained by capturing the shape adjustment image in each of the plurality of regions, specifies three or more line segments included in the shape adjustment image.

(Operation of Projection Display Device)

Figure 13:
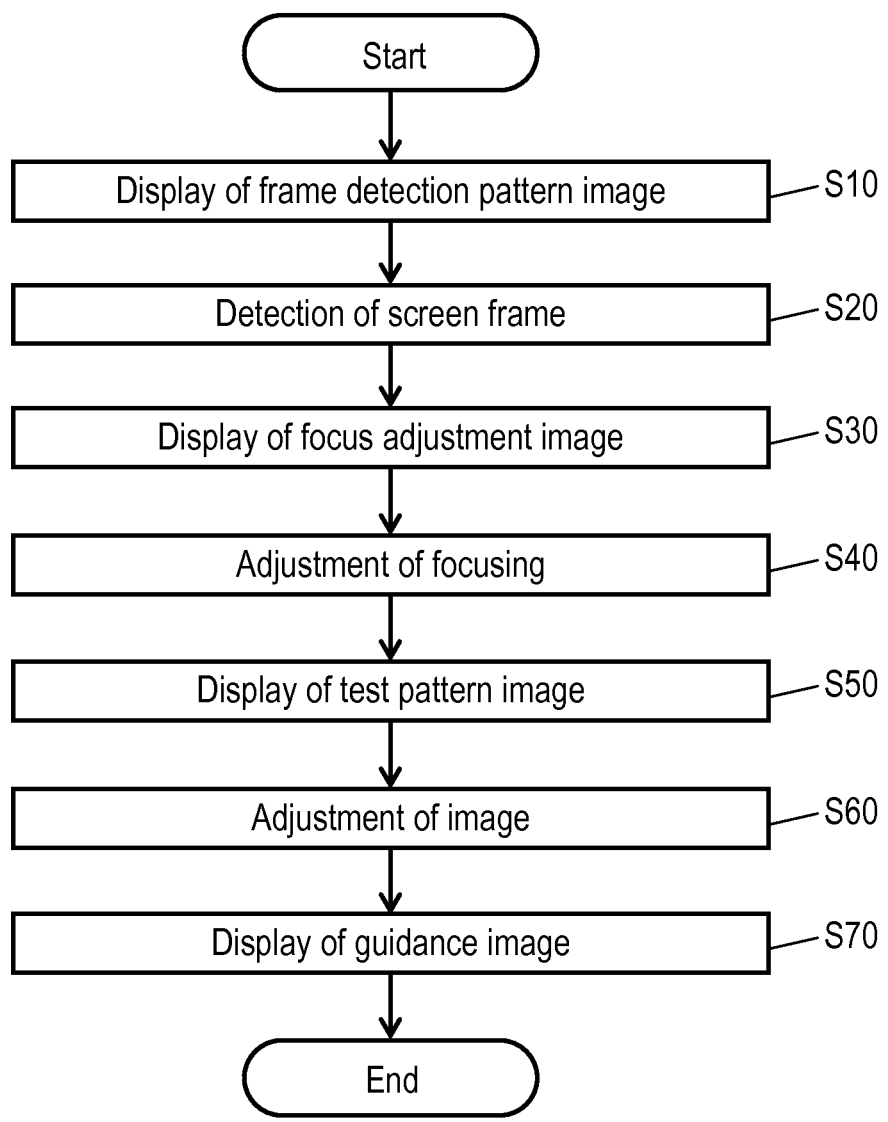
FIG. 13 is a flow chart showing an operation of projection display device 100 according to the first embodiment.

An operation of the projection display device (control unit) according to the first embodiment will be described below with reference to the drawings. FIG. 13 is a flow chart showing an operation of projection display device 100 (control unit 200) according to the first embodiment.

As shown in FIG. 13, in step 10, projection display device 100 displays (projects) a frame detection pattern image on projection screen 400. The frame detection pattern image is, for example, a white image or the like.

In step 20, image capture element 300 arranged in projection display device 100 captures projection screen 400. More specifically, image capture element 300 captures the frame detection pattern image projected on projection screen 400. Subsequently, projection display device 100, on the basis of an image obtained by capturing the frame detection pattern image, detects display frame 420 arranged on projection screen 400.

In step 30, projection display device 100 displays (projects) a focus adjustment image on projection screen 400.

In step 40, image capture element 300 arranged in projection display device 100 captures projection screen 400. More specifically, image capture element 300 captures the focus adjustment image projected on projection screen 400. Subsequently, projection display device 100 adjusts a focus of the focus adjustment image such that a focus value of the focus adjustment image is a maximum value.

In step 50, projection display device 100 displays (projects) a shape adjustment image on projection screen 400.

In step 60, image capture element 300 arranged in projection display device 100 captures projection screen 400. More specifically, image capture element 300 captures the shape adjustment image projected on projection screen 400. Subsequently, projection display device 100 specifies four line segments ($L_t1$ to $L_t4$) included in the captured shape-adjustment-image image, and, on the basis of four line segments ($L_t1$ to $L_t4$), specifies four intersections ($P_t1$ to $P_t4$) included in the captured shape-adjustment-image image. Projection display device 100, on the basis of four intersections ($P_s1$ to $P_s4$) included in the stored shape-adjustment-image image and four intersections ($P_t1$ to $P_t4$) included in captured shape-adjustment-image image, calculates a positional relation between projection display device 100 and projection screen 400. Projection display device 100, on the basis of the positional relation between projection display device 100 and projection screen 400, adjusts a shape of an image projected on projection screen 400 (trapezoidal correction).

In step 70, projection display device 100 displays (projects) a guidance image that guides focus adjustment of an image projected on projection screen 400.

(Operation and Effect)

In the first embodiment, element control unit 260 controls liquid crystal panel 50 to display a guidance image that guides focus adjustment of an image projected on projection screen 400 after the image projected on the projection screen is adjusted. Thus, while reducing the trouble of image adjustment, a sense of anxiety given to a user about whether focus is actually achieved is reduced.

In the first embodiment, three or more line segments included in the shape adjustment image have inclinations with respect to a predetermined line. Firstly, in comparison with the case in which the line segments included in the shape adjustment image are along the predetermined line, the number of pixels to be sampled to perform edge detection or the like can be reduced. Thus, a processing load for image adjustment can be reduced. Secondly, in comparison with the case in which line segments included in the shape adjustment image are along the predetermined line, detection accuracy of the line segments included in the shape adjustment image is improved.

Modification 1

Modification 1 of the first embodiment will be described below with reference to the drawings. In the following description, different points between the first embodiment and modification 1 will be mainly described.

More specifically, in Modification 1, an example of a guidance image will be described. The guidance image includes an image representing the degree of focusing in each of a plurality of regions that divide projection screen 400.
(First Example of Guidance Image)

Figure 14:
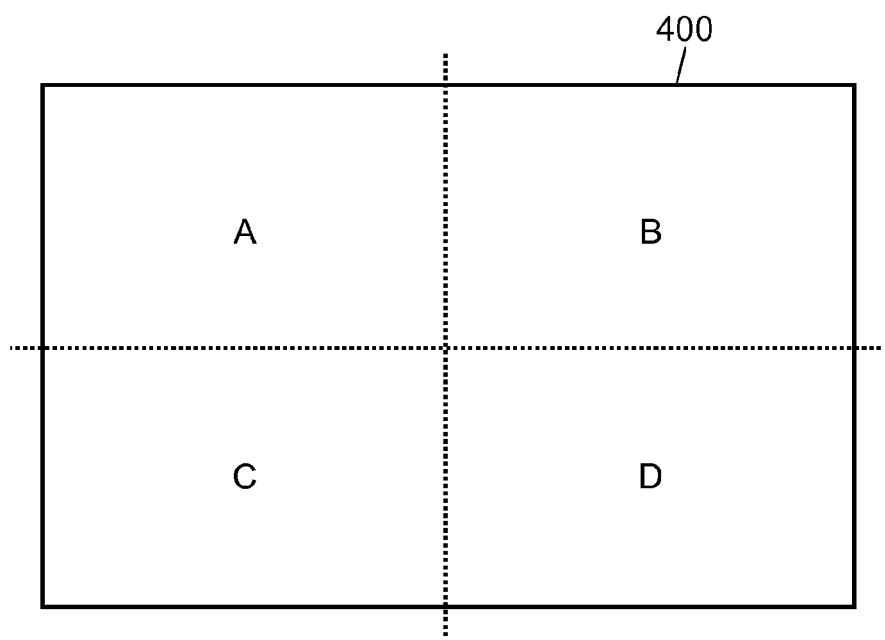
FIG. 14 is a diagram for explaining a first example of a guidance image according to Modification 1.
Figure 15:
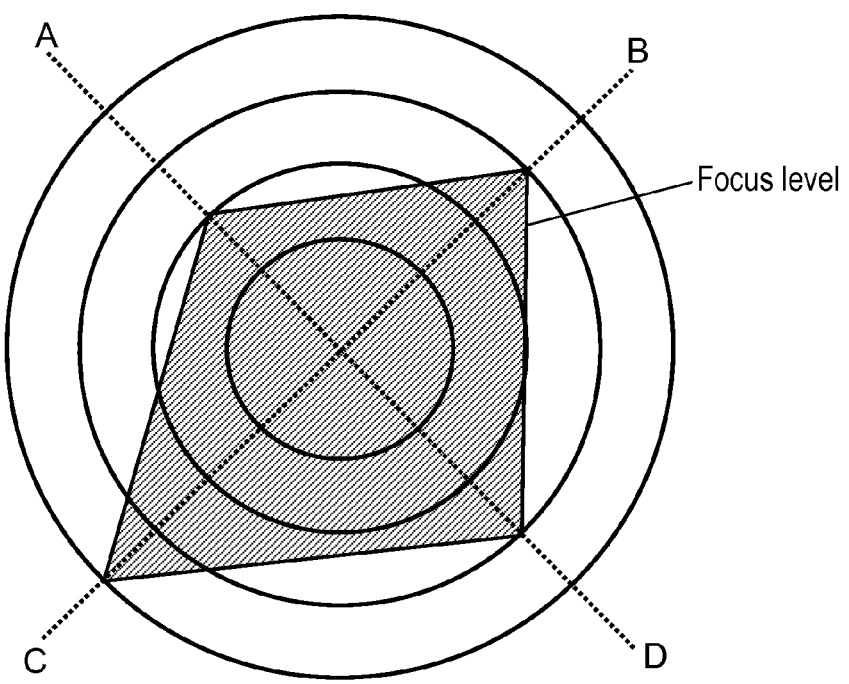
FIG. 15 is a diagram showing the first example of the guidance image according to Modification 1.

For example, as shown in FIG. 14, a case in which projection screen 400 are divided into four regions (region A to region D) will be described. In such a case, as shown in FIG. 15, the guidance image includes an image representing the degree of focusing in each of the plurality of regions that divide projection screen 400. Whether focus is achieved is expressed by a drawing.

More specifically, as shown in FIG. 15, the degree of focusing (focus level) is expressed by a radar chart for each of the plurality of regions. In the radar chart, when the focus level extends to the outside, the focus level is high.

In projection screen 400, a position on which an image (radar chart) representing the degree of focusing is displayed is arbitrarily set. The guidance image may include an image (for example, a character such as "A" shown in FIG. 14) representing the position of each of the regions.
(Second Example of Guidance Image)

Figure 16:
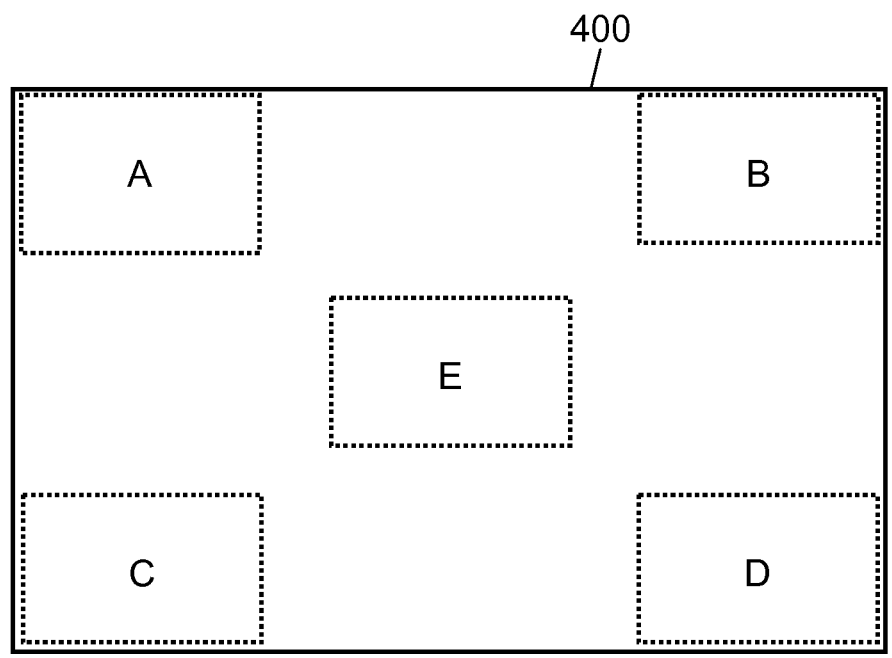
FIG. 16 is a diagram for explaining a second example of the guidance image according to Modification 1.
Figure 17:
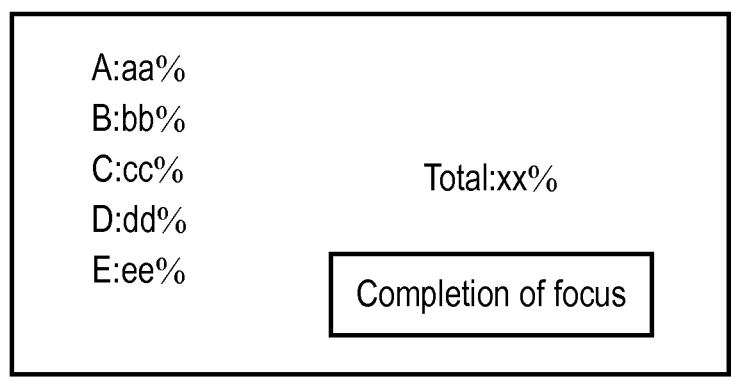
FIG. 17 is a diagram showing the second example of the guidance image according to Modification 1.

For example, as shown in FIG. 16, a case in which projection screen 400 are divided into five regions (region A to region E) will be described. In such a case, as shown in FIG. 17, the guidance image includes an image representing the degree of focusing in each of the plurality of regions that divide projection screen 400. Whether focus is achieved is expressed by a character.

More specifically, as shown in FIG. 17, the degree of focusing (focus level) is expressed by a character (for example, "A:aa %" or the like) for each of the plurality of regions. The degree of focusing of entire projection screen 400 may be expressed by a character (for example, "Total:xx %" or the like). The focus level of entire projection screen 400 is, for example, an average of the focus levels of the plurality of regions.

In projection screen 400, a position on which an image (character) representing the degree of focusing is displayed is arbitrarily set. The guidance image may include an image (for example, a character such as "A" shown in FIG. 16) representing the position of each of the regions.
(Operation and Effect)

In Modification 1, the guidance image includes an image representing the degree of focusing in each of a plurality of regions that divide projection screen 400. Thus, a sense of anxiety given to a user about whether focus is actually achieved is reduced.

Modification 2

Modification 2 of the first embodiment will be described below with reference to the drawings. In the following description, different points between the first embodiment and modification 2 will be mainly described. More specifically, in Modification 2, an example of a guidance image will be described.
(Third Example of Guidance Image)

Figure 18:
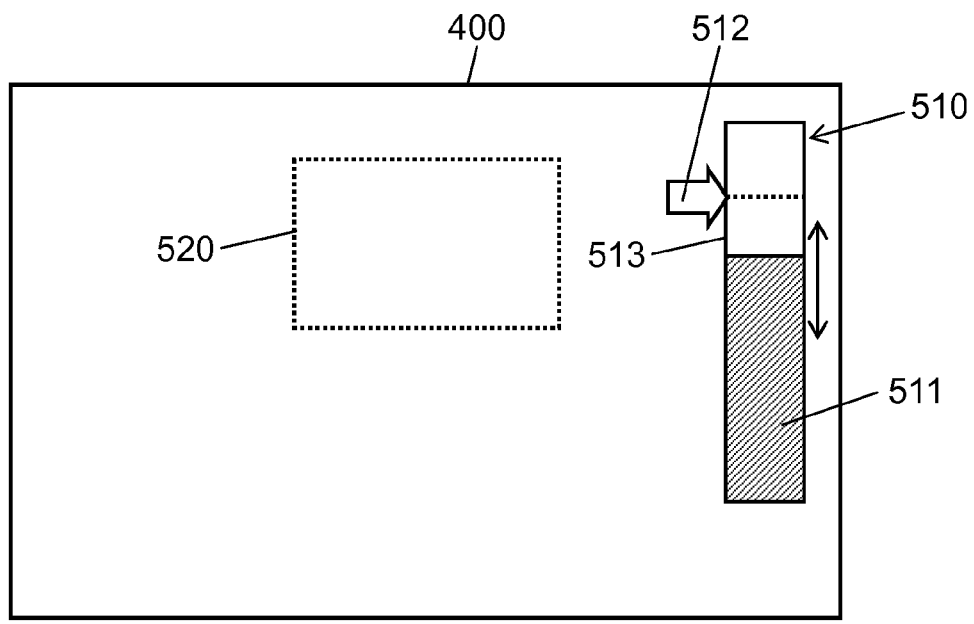
FIG. 18 is a diagram showing a third example of the guidance image according to Modification 2.

As shown in FIG. 18, guidance image 510 includes current focus image 511, maximum focus position image 512, and frame image 513. Guidance image 510 is preferably displayed not to overlap with focus adjustment image display position 520.

Current focus image 511 is an image representing a focus level of entire projection screen 400. Current focus image 511 may be, for example, a bar marked out with a specific color in frame image 513. Depending on an operation of an adjusting tool to adjust focusing, current focus image 511 increases/decreases.

Maximum focus position image 512 is an image representing a position of an adjusting tool having a maximum focus level. Maximum focus position image 512 is expressed with, for example, a graphic such as an arrow or a character.

Frame image 513 is a frame that accommodates current focus image 511. An area in the frame configuring frame image 513 may be marked out with a color different from that of current focus image 511. An area in the frame configuring frame image 513 may be marked out with a color different from that of an area bounded by maximum focus position image 512.

In the third example, current focus image 511 (bar), as shown in FIG. 18, is configured to be increased in a positive direction (or a negative direction). Thus, frame image 513 is displayed such that current focus image 511 can be increased/decreased to have a predetermined margin through maximum focus position image 512.
(Fourth Example of Guidance Image)

Figure 19:
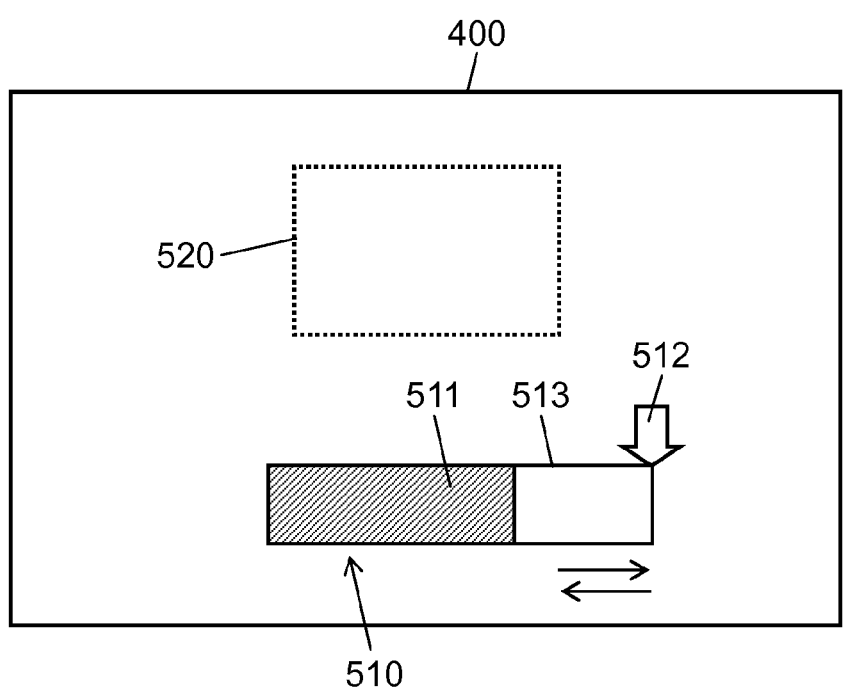
FIG. 19 is a diagram showing a fourth example of the guidance image according to Modification 2.

As shown in FIG. 19, guidance image 510 includes, as in the third example (see FIG. 18), current focus image 511, maximum focus position image 512, and frame image 513.

In the fourth example, as shown in FIG. 19, when a current focus level gets close to the maximum focus level, frame image 513 is displayed to increase current focus image 511 (bar). In other words, when a current focus level gets away from the maximum focus level, frame image 513 is displayed to decrease current focus image 511 (bar). For example, when a focus is adjusted in a positive direction (or a negative direction), when the current focus level exceeds the maximum focus level, an increase in current focus image 511 (bar) changes into a decrease.
(Fifth Example of Guidance Image)

Figure 20:
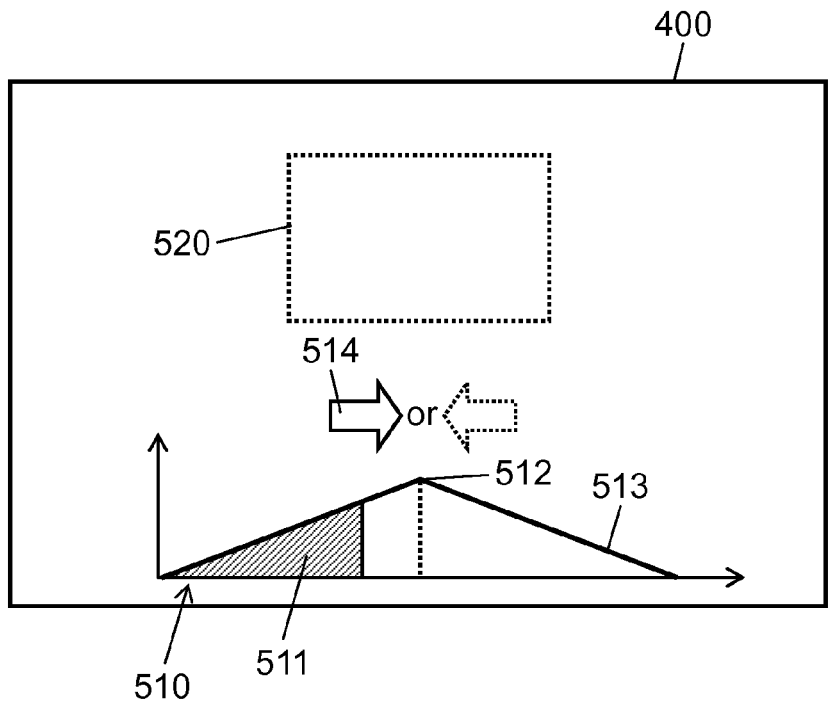
FIG. 20 is a diagram showing a fifth example of the guidance image according to Modification 2.

As shown in FIG. 20, guidance image 510 includes, as in the third example (see FIG. 18), current focus image 511, maximum focus position image 512, and frame image 513. Guidance image 510 includes operation direction image 514. Operation direction image 514 is an image showing a direction in which the adjusting tool should be operated. Operation direction image 514 is, for example, an arrow or a character.

In the fifth example, as in the third example, frame image 513 is displayed such that current focus image 511 can be increased/decreased to have a predetermined margin through maximum focus position image 512.
(Sixth Example of Guidance Image)

Figure 21:
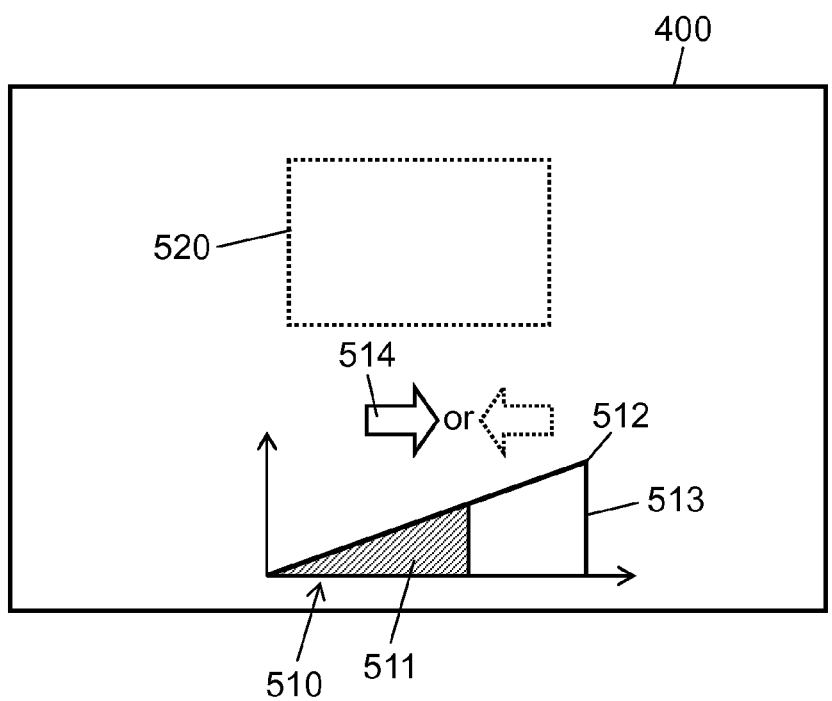
FIG. 21 is a diagram showing a sixth example of the guidance image according to Modification 2.

As shown in FIG. 21, guidance image 510 includes, as in the fifth example (see FIG. 20), current focus image 511, maximum focus position image 512, frame image 513, and operation direction image 514.

In the sixth example, as in the fourth example, when a current focus level gets close to the maximum focus level, frame image 513 is displayed to increase current focus image 511.
(Seventh Example of Guidance Image)

Figure 22:
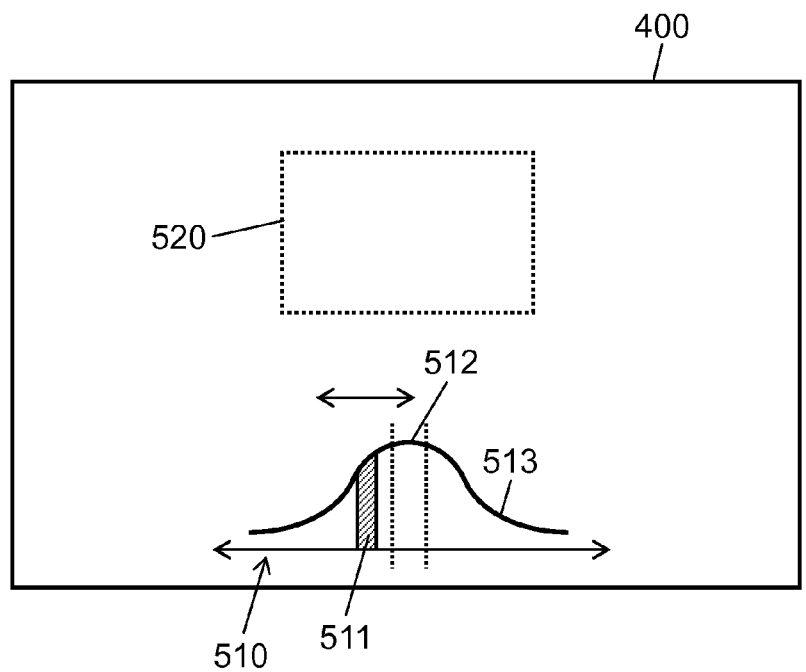
FIG. 22 is a diagram showing a seventh example of the guidance image according to Modification 2.

As shown in FIG. 22, guidance image 510 includes, as in the third example (see FIG. 18), current focus image 511, maximum focus position image 512, and frame image 513.

In the seventh example, frame image 513 has a normal-distribution shape having a peak in maximum focus position image 512. Current focus image 511 is a line-like indicator representing a current focus level. The line-like indicator is configured to move depending on an operation of the adjusting tool.

In the seventh example, when current focus image 511 gets close to maximum focus position image 512, guidance image 510 is displayed to change the colors of current focus image 511.

(Eighth Example of Guidance Image)

Figure 23:
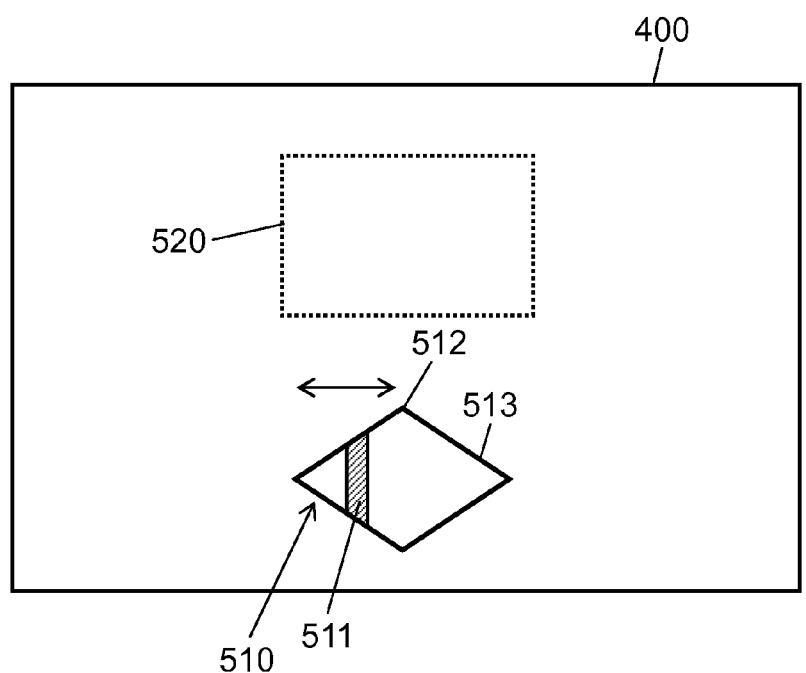
FIG. 23 is a diagram showing an eighth example of the guidance image according to Modification 2.

As shown in FIG. 23, guidance image 510 includes, as in the third example (see FIG. 18), current focus image 511, maximum focus position image 512, and frame image 513.

In the eighth example, frame image 513 has a shape having a maximum area in maximum focus position image 512. Current focus image 511 is a line-like indicator representing a current focus level. The line-like indicator is configured to move depending on an operation of the adjusting tool.

In the eighth example, guidance image 510 is displayed such that the area of the line-like indicator configuring current focus image 511 is maximum in maximum focus position image 512.

(Ninth Example of Guidance Image)

Figure 24:
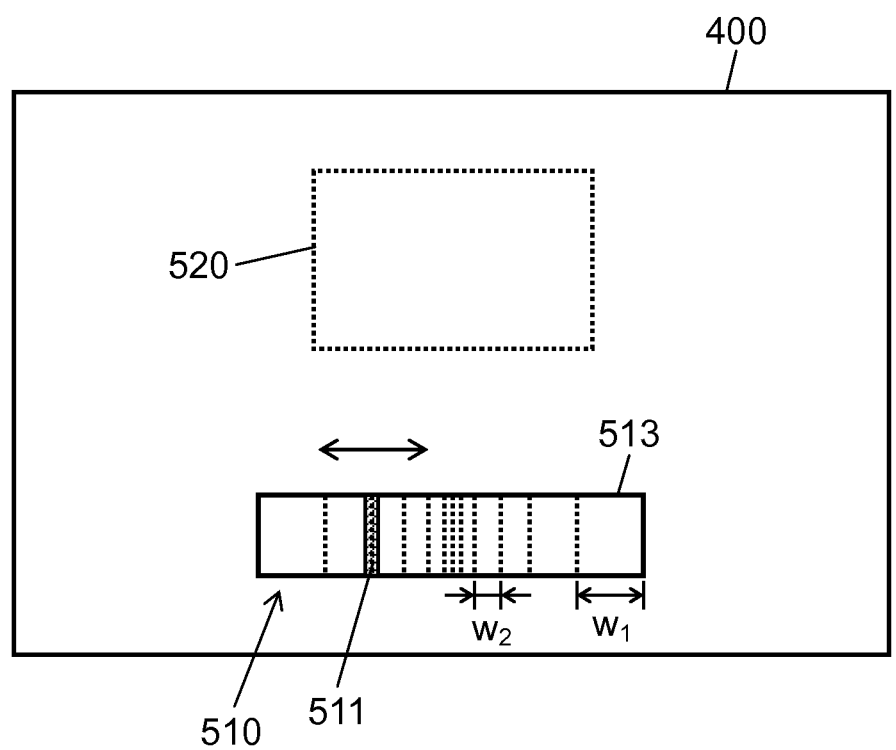
FIG. 24 is a diagram showing a ninth example of the guidance image according to Modification 2.

As shown in FIG. 24, guidance image 510 includes current focus image 511 and frame image 513. Current focus image 511 is a line-like indicator representing a current focus level. The line-like indicator is configured to move depending on an operation of the adjusting tool.

In the ninth example, when the current focus level gets close to the maximum focus level, guidance image 510 is displayed to reduce a moving range of the line-like indicator. For example, moving range $w_2$ obtained when the maximum focus level is close to the current focus level is smaller than moving range $w_1$ obtained when the maximum focus level is very different from the current focus level.

Modification 3 may be combined to Modification 2. More specifically, guidance image 510 according to each of the third example to the ninth example may be displayed in each of the plurality of regions.

Another Exemplary Embodiment

The present invention has been described by the above embodiment, the statement and the drawings that partially configure the disclosure should not be understood to limit the present invention. From the disclosure, various alternate embodiments, examples, and operational techniques will be apparent to persons skilled in the art.

In the above embodiments, a white light source is illustrated as a light source. However, the light source may be an LED (Laser Emitting Diode) or an LD (Laser Diode).

In the above embodiment, as an optical modulation element, a transparent liquid crystal panel is illustrated. However, the optical modulation element may be a reflective liquid crystal panel or a DMD (Digital Micromirror Device).

Although not specially mentioned in the above embodiment, element control unit 260 preferably controls liquid crystal panel 50 such that an image is not displayed until the shape adjustment image is displayed after display frame 420 is detected.

Although not specially mentioned in the above embodiment, element control unit 260 preferably controls liquid crystal panel 50 such that an image is not displayed until the shape of an image projected on projection screen 400 is adjusted after three or more intersections included in the captured shape-adjustment-image image are acquired.

Although not specially mentioned in the above embodiment, element control unit 260 preferably controls liquid crystal panel 50 such that a predetermined image (for example, background image) except for the shape adjustment image is displayed together with the shape adjustment image.

For example, the shape adjustment image is configured by a color or a brightness that can be detected by image capture element 300, and predetermined images except for the shape adjustment image are configured by a color or a brightness that cannot be detected by image capture element 300.

Alternatively, the shape adjustment image is configured by any one of red, green, and blue, and the predetermined images are configured by the other colors. Image capture element 300 acquires an image obtained by capturing the shape adjustment image by detecting only the color configuring the shape adjustment image.

When image signal is not input, element control unit 260 may control liquid crystal panel 50 to display an error message as a predetermined image together with the shape adjustment image. Alternatively, when a line segments or an intersection included in the shape adjustment image cannot be specified, element control unit 260 may control liquid crystal panel 50 to display an error message as a predetermined image.

In the embodiment, projection display device 100 adjusts focusing after display frame 420 is detected. However, the embodiment is not limited to the above configuration. For example, projection display device 100 may adjust focusing without detecting display frame 420. More specifically, in a normal using mode, since it is assumed that a central part of projectable region 410 is included in display frame 420, projection display device 100 may display a focus adjustment image on the central part of projectable region 410 to adjust the focus of an image (focus adjustment image) displayed on the central part of projectable region 410.

In the embodiment, the shape adjustment image includes a black background part and a white pattern part. However, the embodiment is not limited to the above configuration. For example, the background part may be white, and the pattern part may be black. The background part may be blue, and the pattern part may be white. More specifically, the background part and the pattern part need only have a brightness difference which is enough to make it possible to perform edge detection. The difference that is enough to make it possible to perform edge detection is determined depending on accuracy of image capture element 300. When the brightness difference between the background part and the pattern part increases, the accuracy of image capture element 300 is not required. For this reason, the cost of image capture element 300 can be reduced as a matter of course.

Figure 25:
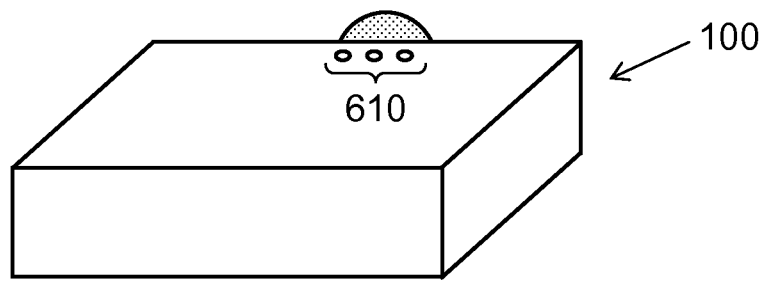
FIG. 25 is a diagram for explaining another embodiment.
Figure 26:
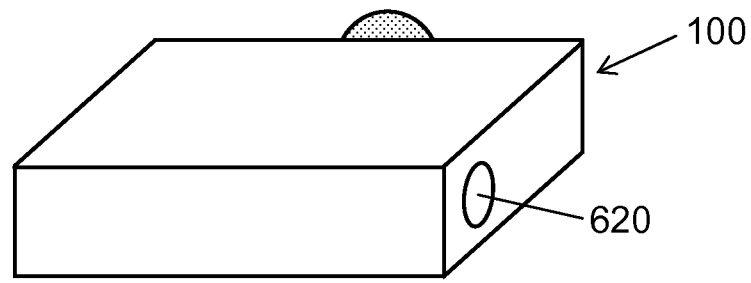
FIG. 26 is a diagram for explaining still another embodiment.

In the embodiment described above, the case in which a guidance image that guides focus adjustment of an image projected on projection screen 400 is displayed (projected) on projection screen 400 is illustrated. However, the embodiment is not limited to the above configuration. More specifically, as shown in FIG. 25, depending on the number of lights that are turn on of the lights configuring light group 610 (for example, LED group) arranged in projection display device 100, the focus level may be guided. In such a case, when the current focus level gets close to the maximum focus level, the number of lights that are turn on increases. Alternatively, as shown in FIG. 26, by sound output from loudspeaker 620 arranged in projection display device 100, the focus level may be guided. In such a case, when the current focus level becomes close to the maximum focus level, sound is output from loudspeaker 620.

Although not specially mentioned in the embodiment, as shown in FIG. 27, focus adjusting tool 630 to manually adjust focusing may be arranged at a position different from the position of zoom adjusting tool 640 to manually adjust zooming.

Although not specially mentioned in the embodiment, as shown in FIG. 28, seal body 650 to form a flat surface may be attached on projection screen 400. Seal body 650 is attached to a position where a shape adjustment image or a focus adjustment image is displayed.

REFERENCE MARKS IN THE DRAWINGS

10 . . . light source, 20 . . . UV/IR cut filter, 30 . . . fly-eye lens unit, 40 . . . PBS array, 50 . . . liquid crystal panel, 52, 53 . . . polarization plate, 60 . . . cross-die clock cube, 71 to 76 . . . mirror, 81 to 85 . . . lens, 100 . . . projection display device, 110 . . . projection unit, 120 . . . illumination unit, 200 . . . control unit, 210 . . . image signal accepting unit, 220 . . . storage unit, 230 . . . acquiring unit, 240 . . . specifying unit, 250 . . . calculation unit, 260 . . . element control unit, 270 . . . projection unit control unit, 280 . . . adjusting unit, 300 . . . image capture element, 400 . . . projection screen, 410 . . . projectable region, 420 . . . display frame, 510 . . . guidance image, 511 . . . current focus level image, 512 . . . maximum focus level position image, 513 . . . frame image, 514 . . . operation direction image, 610 . . . light group, 620 . . . loudspeaker, 630 . . . focus adjusting tool, 640 . . . zoom adjusting tool, 650 . . . seal body.

The invention claimed is:

1. A projection display device that includes an optical modulation element that modulates light outputting from a light source and a projection unit that projects light modulated by the optical modulation element on a projection screen, the projection display comprising:
    an element control unit controlling the optical modulation element to display a test pattern image;
    an acquiring unit acquiring a captured image of the test pattern image from an image capture element that captures the test pattern image projected on the projection screen; and
    an adjusting unit adjusting an image projected on the projection screen based on the captured image acquired by the acquiring unit, wherein
    the element control unit controls the optical modulation element such that a guidance image that guides focus adjustment of the image projected on the projection screen is displayed,
    the test pattern image is a shape adjustment image that configures at least a part of each of three or more line segments configuring three or more intersections,
    the acquiring unit acquires a captured image of the shape adjustment image output along a predetermined line from the image capture element,
    the projection display device further comprises a calculation unit,
    the calculation unit specifies three or more intersections of three or more line segments included in the captured image acquired by the acquiring unit and calculates a positional relation between the projection display device and the projection screen based on the three or more intersections, the adjusting unit adjusts a shape of an image projected on the projection screen based on the positional relation between the projection display device and the projection screen, and
    the three or more line segments included in the shape adjustment image have inclinations with respect to the predetermined line.

2. The projection display device according to claim 1, wherein
    the guidance image includes an image representing a degree of focusing in each of a plurality of regions that divide the projection screen.

3. The projection display device according to claim 1, wherein the guidance image includes a diagram showing whether or not focus is adjusted.

4. The projection display device according to claim 1, wherein the guidance image includes a character showing whether or not focus is adjusted.

5. The projection display device according to claim 1, further comprising:
    an adjusting tool adjusting focus of an image projected on the projection screen depending on an operation in a predetermined direction, wherein
    the guidance image includes an image representing a direction in which the adjusting tool is to be operated.

6. The projection display device according to claim 2, wherein the guidance image includes a diagram showing whether or not focus is adjusted.

7. The projection display device according to claim 2, wherein the guidance image includes a character showing whether or not focus is adjusted.

8. The projection display device according to claim 2, further comprising:
    an adjusting tool adjusting focus of an image projected on the projection screen depending on an operation in a predetermined direction, wherein
    the guidance image includes an image representing a direction in which the adjusting tool is to be operated.

* * * * *